A. J. SWEENEY.
MOLD FOR GLASS BOTTLES.
No. 29,017.  Patented July 3, 1860.
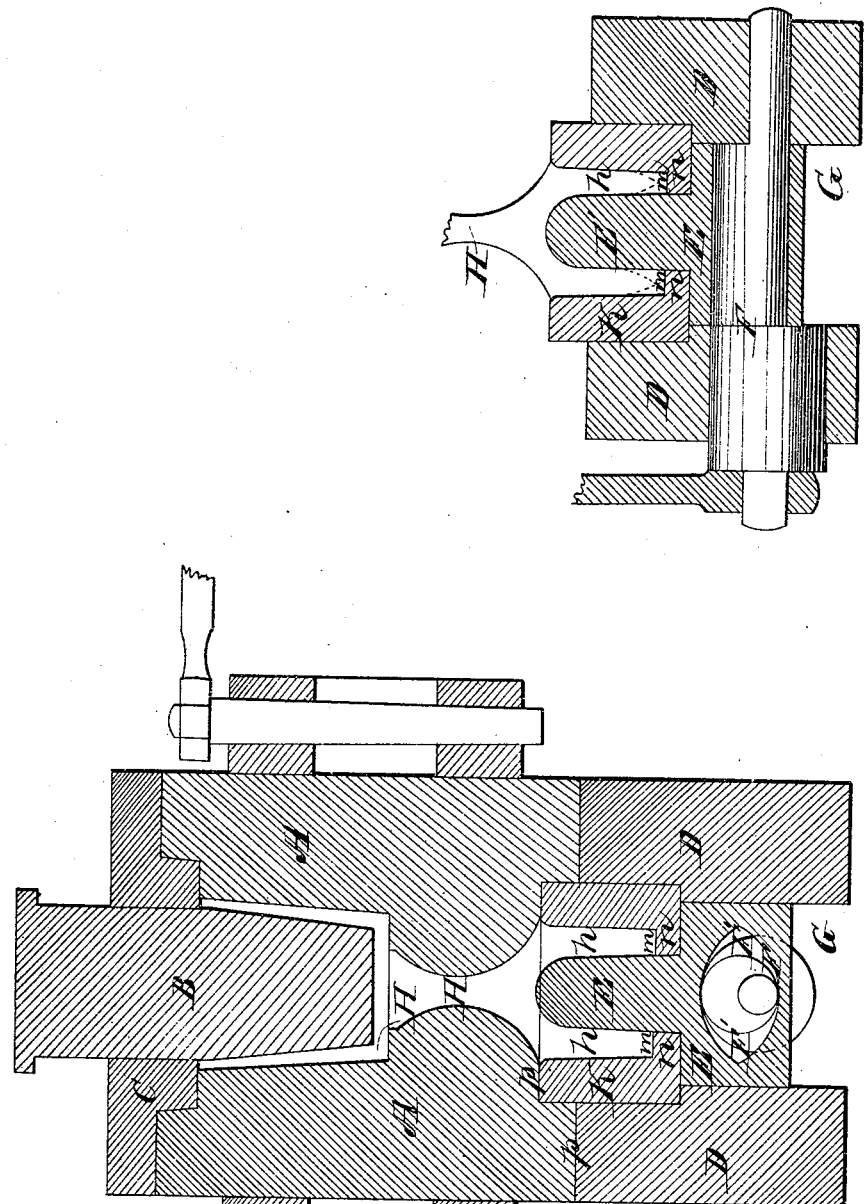
Witnesses:
Inventor:
A. J. Sweeney

UNITED STATES PATENT OFFICE.

ANDREW I. SWEENEY, OF WHEELING, VIRGINIA.

MOLD FOR GLASS GOBLETS, &c.

Specification of Letters Patent No. 29,017, dated July 3, 1860.

*To all whom it may concern:*

Be it known that I, ANDREW I. SWEENEY, of Wheeling, in the county of Ohio and State of Virginia, have invented a new and useful improvement in the form of mold for making the foot on a goblet or other article which may be made of glass, by the use of which the foot is made ready to finish without having or showing a mark of a mold-joint on its surface; and I do hereby declare that the following is a full, clear, and exact description of the construction and operation of the same, reference being had to the annexed drawing, making a part of this specification.

The nature of my invention consists in the construction and combination of mechanism for effecting the above named purpose and is hereinafter fully described.

A represents the body part of the mold for making a goblet or other article, C the rim-plate at the top of the mold, and B the plunger.

H is a section of the body and leg of the goblet in the mold.

$h$ represents a section of the cylindrical shape in which the foot of the article is first to be made.

D is a block forming the lower part or base of the mold, having a cylindrical opening defined by the lines in the drawing between it and the pieces K and E. A piece K is inserted in the upper part of the cylindrical opening in the block D having in it an opening or cavity extending to a depth sufficient to answer the purpose intended (say at $m$); which opening or cavity has a slight taper and is largest at the top. This cavity or opening which is intended to form the outside of the cylinder (which is to be opened to a flat disk or foot as hereinafter explained) may be made in the piece K or in the piece D itself. At $m$ there is made an offset or collar $n$ formed of the piece K. A piece E is fitted into the cavity G (G is the cavity first named in the block D defined by the lines between the parts D, K and E) which piece E has a projection E′ extending through the collar $n$ to a sufficient distance and forms the inside of the cylinder $h$. The thickness of the cylinder $h$ which is to be subsequently formed into a foot will be governed by the width of the space between the piece K and the piece E′ of the piece E. The part E′ of the piece E is slightly tapered from the point $m$, being smallest at the top; a cam-pin F or other suitable contrivance passes through an opening in the piece E and through bearings in the block D having at one end, and outside of the block D a handle by which it may be operated, the object of which cam-pin is hereinafter described.

The body part A of the goblet mold is parted vertically, hinged and secured all in the usual manner, which part A in opening, slides on the top of the block D at $p$ shown by a red line in the drawing.

The operation of my invention is as follows. The mold being closed and ready for the reception of glass to make a goblet or other article, a sufficient amount of glass is cut off into the body of the mold in the usual way, and the mold placed under the plunger which is attached to the piston of a press. The plunger being forced down upon and into the glass causes a portion of the glass to descend through that part of the mold designed to form the leg or stem of the goblet and into the cavity in the piece K and over and around the piece E′ of the piece E. The glass also fills the body of the mold A, around the plunger B up to the rim-plate C. As soon as the mold is filled, the piece E′ is to be withdrawn so that the part $h$ of the goblet may not be broken by contracting on it. This may be accomplished by means of the cam-pin F or other suitable contrivance. By taking hold of the handle of the cam-pin F and turning it over, the piece E E′ which as hereinbefore explained is tapered, and smallest at the top, can be withdrawn out of the part $h$ by the workman, sufficient space being provided in the height of the cavity in the block D. By turning the cam back again the piece E, E′ is caused to resume its position preparatory to refilling the mold with glass. The mold being now filled the plunger B and the piece E′ as above explained are withdrawn, the mold opened in the ordinary way, and the goblet taken out to be finished and polished. It is handled in the usual manner by means of a "snap" or "punty" attached first to the body of the goblet so that the foot can be changed from the cylindrical shape given it by the mold, by warming it in the usual manner, and opening the cylinder $h$ up into a flat disk or foot of the desired shape. The "snap" or "punty" can then be attached to the foot and the body of the goblet fire-polished in the usual manner.

What I claim as my invention and desire to secure by Letters Patent is—

The combination of the block D with the piece K or its equivalent and with the piece E, E' operating as above described and for the purpose set forth.

A. I. SWEENEY.

Witnesses:
 DAVID BELL,
 J. M. CLUNEY.